United States Patent
Harris et al.

(10) Patent No.: US 10,946,802 B2
(45) Date of Patent: Mar. 16, 2021

(54) SLIDING CENTER CONSOLE

(71) Applicant: Brose Fahrzeugteile GmbH & Co. Kommanditgesellschaft, Coburg, Coburg (DE)

(72) Inventors: Daryl Harris, Oxford, MI (US); Tim Bossingham, Clarkston, MI (US); Todd Bachman, Brighton, MI (US)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 125 days.

(21) Appl. No.: 16/290,889

(22) Filed: Mar. 2, 2019

(65) Prior Publication Data
US 2020/0276937 A1 Sep. 3, 2020

(51) Int. Cl.
*B60R 7/04* (2006.01)
*F16H 19/04* (2006.01)

(52) U.S. Cl.
CPC .............. *B60R 7/04* (2013.01); *F16H 19/04* (2013.01)

(58) Field of Classification Search
CPC ................................. B60R 7/04; F16H 19/04
USPC ...................................................... 296/24.34
See application file for complete search history.

(56) References Cited

U.S. PATENT DOCUMENTS

| 6,135,529 | A  | * | 10/2000 | De Angelis | B60R 7/04 296/37.8 |
| 7,152,897 | B2 | * | 12/2006 | Bonnes | B60N 2/072 296/35.1 |
| 7,520,552 | B2 | * | 4/2009 | Nakamura | B60R 7/04 108/44 |
| 9,963,084 | B2 | * | 5/2018 | Jacobsthal | B60N 2/797 |
| 2008/0303302 | A1 | * | 12/2008 | Sturt | B60R 7/04 296/24.34 |
| 2010/0013256 | A1 | * | 1/2010 | Arndt | B60R 7/04 296/24.34 |
| 2010/0078954 | A1 | * | 4/2010 | Liu | B60N 2/793 296/24.34 |
| 2010/0201147 | A1 | * | 8/2010 | Jones | B60N 2/793 296/24.34 |
| 2011/0042972 | A1 | * | 2/2011 | Penner | E05B 85/18 292/336.3 |
| 2011/0121596 | A1 | * | 5/2011 | Beyer | B60R 7/04 296/24.34 |
| 2011/0127791 | A1 | * | 6/2011 | Penner | B60R 7/04 296/24.34 |
| 2013/0187400 | A1 | * | 7/2013 | D.Alessandro | B60R 7/04 296/24.34 |
| 2014/0175820 | A1 | * | 6/2014 | Lechkun | B60N 3/101 296/24.34 |
| 2018/0370444 | A1 | * | 12/2018 | Porcs | B60N 2/793 |

* cited by examiner

*Primary Examiner* — Pinel E Romain
(74) *Attorney, Agent, or Firm* — Brooks Kushman, P.C.

(57) ABSTRACT

A sliding center console may include a mounting member, a carrier, and a gearbox assembly. The carrier may be configured to receive a container and translate between a first position and a second position. The carrier may include a plurality of teeth. The gearbox assembly may be fixed to the mounting member and include a pinion configured to rotate in a first rotational direction or second rotational direction to translate the carrier from the first position to the second position.

21 Claims, 5 Drawing Sheets

SLIDING CENTER CONSOLE

TECHNICAL FIELD

The present disclosure relates to interior storage compartments for vehicles. More specifically, the disclosure relates to a movable center console for a vehicle.

BACKGROUND

Larger vehicles, such as sport utility vehicles or vans may include first, second, and third rows of seats within the vehicle cabin. The various rows of seats may be bench seats, one continuous seat, or two individual seats that are spaced apart from one another. Generally, the two seats of the first row or front row are disposed on either side of a center console assembly. A fixed center console between two individual seats in the second row would block ingress to the third row of seats from the vehicle cabin.

Center consoles serve several purposes such as providing storage and housing climate controls and entertainment features.

SUMMARY

According to one embodiment, a sliding center console for a vehicle is provided. The sliding center console may include a mounting member, a carrier, and a gearbox assembly. The carrier may be configured to receive a container and translate between a first position and a second position. The carrier may include a plurality of teeth. The gearbox assembly may be fixed to the mounting member and include a pinion configured to rotate in a first rotational direction or second rotational direction to translate the carrier from the first position to the second position.

A portion of the carrier may define a first cavity and the plurality of teeth may extend into the first cavity and engage the pinion.

The cavity may be formed by a slot that may be defined by a longitudinal-extending wall of the carrier. The plurality of teeth may extend from a first inner wall of the slot.

The plurality of teeth may include a first set of teeth and a second set of teeth, the second set of teeth may extend from a second inner wall of the slot.

The inner wall may be formed of a first material and a tooth of the plurality of teeth may be formed of a second material that is different than the first material.

A base portion of the tooth of the plurality of teeth may be fixed to a portion of the inner wall by a bond between the first and second materials.

The carrier may define a second cavity configured to receive an elongated rack, and the elongated rack may define the plurality of teeth that extend into the first cavity.

According to another embodiment, a sliding center console for a vehicle is provided. The sliding center console may include a mounting member, a carrier, an elongated rack, and a gearbox assembly. The carrier may be configured to receive a container and translate between a first position and a second position. The elongated rack may define a plurality of teeth that may extend into the cavity. The gearbox assembly may be fixed to the mounting member and include a pinion that is configured to rotate in a first rotational direction or second rotational direction to translate the carrier from the first position to the second position. At least a portion of the pinion may be disposed within the cavity such that the pinion engages at least one tooth of the plurality of teeth defined by the elongated rack.

According to another embodiment, a sliding center console for a vehicle is provided. The sliding center console may include a mounting member, a container, an elongated rack, and a gearbox assembly. The container may define a receptacle and include a plurality of teeth. The container may be configured to translate between a first position and a second position. The gearbox assembly may be fixed to the mounting member and include a pinion that is configured to rotate in a first rotational direction or second rotational direction to translate the container from the first position to the second position.

A portion of the container may define a cavity and the plurality of teeth and the pinion may each extend into the cavity so that the pinion engages one or more of the plurality of teeth.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An exemplary center console including a fixed portion and a sliding portion that moves relative to the fixed portion is described in International Application Number PCT/US18/47688 (the '688 application). The center console described in the '688 application includes a carrier that is attached to an elongated rack, that includes a number of teeth, by a rack attachment bracket. The elongated rack is moved by a gearbox assembly that is fixed to a base member.

The term "longitudinal" means a direction that extends along a length of the vehicle, e.g., between the Front of Vehicle (F.O.V.) and Rear of Vehicle (R.O.V.).

The terms "first" or "second" are merely used to distinguish one element, portion, or section from another element, portion, or section and are not intended to be limiting.

The terms "upper" or "lower" are used to identify a relative position of an element, portion, or section. As one example, a lower element is positioned closer to the vehicle floor than an upper element.

The term bond may refer to a molecular bond often formed by a two-shot molding process. This process may cause the molecules of the first and second materials to bond to one another thereby avoiding the need for an adhesive or other suitable connection means.

As another example, the term bond may refer to a mechanical connection, or chemical connection, or both, formed by an over-molding process.

In yet another example, the bond may be a purely mechanical bond, such as an interference fit condition or force fit condition. Another example of a mechanical bond may include one or more surfaces of a first part and one or more surfaces of a second part each having engagement or retention features that are configured to engage with one another. The percentages of interfacing surfaces that contact each other is in the range of 50% to 100%.

Figure 1:
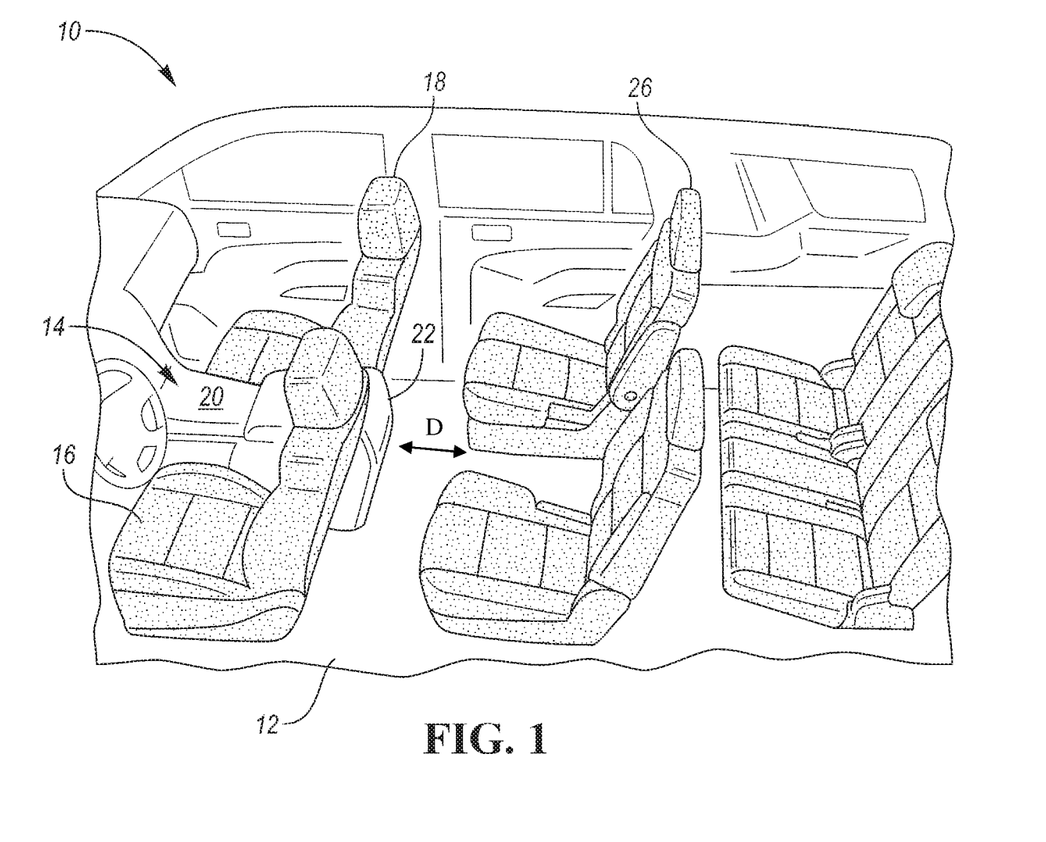
FIG. 1 is an environmental view of a vehicle cabin that includes a moving center console.

FIG. 1 illustrates a vehicle 10, in particular, a vehicle cabin that includes a vehicle floor 12 and a sliding center console assembly 14 that is attached to the floor 12. The sliding center console 14 includes a fixed portion 20 and a sliding or translating portion 22. In one embodiment, the translating portion 22 of the center console assembly 14 may be coupled to and move along an elongated cavity such as a slot or track formed within the floor 12. Here, sliding center console assembly 14 is disposed in a forward position, between a driver's seat 16 and a passenger seat 18. The translating portion 22 may be configured to move along the directional arrow D.

Referring to FIG. 2 through FIG. 6, a sliding center console frame assembly 24 for a sliding center console assembly according to one or more embodiments is provided. The frame assembly 24 may include a mounting member 26, a carrier 28, and a gearbox assembly 30. The gearbox assembly 30 may be fixed, directly or indirectly to the mounting member 26 and include a pinion 32 that is configured to rotate in either a first rotational direction of a second rotational direction to translate the carrier 28. The carrier 28 may be configured to receive a container 34 that houses or stores one or more items.

The carrier 28 includes a plurality of teeth 36 that engage the pinion 32 so that as the pinion 32 rotates in the first rotational direction, the carrier 28 translates in a first direction with respect to the mounting member 26. And as the pinion 32 rotates in a second rotational direction, the carrier 28 translates in second direction with respect to the mounting member 26. The carrier 28 may move between a first position e.g., a stowed position and a second position e.g., a deployed position and number of other positions between the first and second positions. When the carrier 28 is in the deployed position, the carrier 28 may be positioned so that one or more occupants seated in a second or third row of the vehicle 10 may access the container 34.

The carrier 28 may include a longitudinal extending portion 38 that defines a cavity 40. The plurality of teeth 36 may extend into the cavity 40 of the longitudinal extending portion 38. At least a portion of the pinion 32 may be disposed within the cavity 40 so that the pinion 32 engages one or more of plurality of teeth 36. The longitudinal extending portion 38 may define a slot such as a longitudinal extending slot 42. The sections of the longitudinal extending portion 38 that surround the slot 42 may form at least a portion of the cavity 40. The slot 42 may include one or more inner edges, such as an upper inner edge 44 and a lower inner edge 46. The plurality of teeth 36 may extend below the upper inner edge 44 or above the lower inner edge 46, or both. The upper inner edge 44 and the lower inner edge 46 may be connected to one another by a front edge 48 and a rear edge 50. The front edge 48 and rear edge 50 may serve as a front end stop and a rear end stop by engaging the pinion 32 when the carrier 28 is in the first and second positions, respectively.

While the plurality of teeth 36 are shown extending from or being attached to both the upper inner edge 44 and the lower inner edge 46, in one or more embodiments the plurality of teeth 36 may only extend from be attached to either the upper inner edge 44 or the lower inner edge 46.

The longitudinal extending portion 38 may include a middle wall 56 that extends between a pair of sidewalls 58 and 60. The middle wall 56 may be attached or integrally formed with a vertical wall 62 that may be configured to engage a portion of the container 34. The cavity 40 and longitudinal extending slot 42 may be defined by the middle wall 56 (FIG. 6), the first sidewall 58, or the second sidewall 60. If one of the sidewalls 58 and 60 defines the cavity 40 and the slot 42, the middle wall 56 may include a raised section or raised portion 63 that is configured to receive or accommodate a portion of the gearbox assembly 30 when the carrier 28 is coupled to the mounting member 26.

In one or more embodiments, the plurality 36 of teeth may be integrally formed with the longitudinal extending portion 38. In one example, the carrier 28 and each of the plurality of teeth 36 may each be formed of a plastic or polymeric material by injection molding or another suitable process. The carrier 28 and the plurality of teeth 36 may each be formed of a plastic material, such as, polypropylene, polyamide, or other suitable materials that provide similar strength, rigidity, and wear resistant properties.

In yet another embodiment, the carrier 28 and the plurality of teeth 36 may each be formed of two different plastic materials. The carrier may be comprised of a first plastic material, such as, polypropylene, polyamide, or other suitable materials that provide similar strength, rigidity, and wear resistant properties. And one or more of the plurality of teeth 36 may be formed of a second plastic material that may provide additional strength, rigidity, and wear resistant properties as compared to the first plastic material. As one example, one or more of the plurality of teeth 36 may be formed by a thermoplastic composite material, e.g., organo sheet, or other suitable materials. In one or more embodiments, the carrier 28 and the plurality of teeth 36 may be formed by a two-shot (or three-shot) injection molding process. A two-shot injection molding process includes injecting a first material into a mold and injecting a second material into the same mold as the first material cools. The first and second materials form a bond, e.g., molecular bond, mechanical bond, or some combination thereof.

Forming the carrier 28 and the plurality of teeth 36 from plastic by an injection molding process may result in less weight as compared to a carrier and mechanism formed of metal. Moreover, the structure of the carrier 28 and the plurality of teeth 36 described above may decrease design complexity and assembly time by reducing the number of components required for the assembly.

In another example, the plurality of teeth 36 may be defined by an elongated rack 52. The elongated rack may be formed of metal such as a high strength steel or other metal or alloy having similar properties. The longitudinal extending portion 38 of the carrier 28 may define a second cavity 54 that receives the elongated rack 52. The elongated rack 52 may be partially encapsulated e.g., surrounded by portions of the longitudinal extending portions on two or more sides of the elongated rack 52. The second cavity 54 may be disposed near the first cavity 40 so that the plurality of teeth 36 of the elongated rack 52 extend into the first cavity 40. The elongated rack 52 may be fixed within the second cavity 54 by over molding the elongated rack 52. Over molding is a process used in injection molding where a first part e.g., the elongated rack 52 is placed in a mold and melted plastic, forming a second part, is injected into the mold to at least partially encapsulate the first part.

In one or more embodiments the mounting member 26 may be fixed to the vehicle floor 12 (FIG. 1) or the mounting member 26 may be fixed to the vehicle floor 12.

In one or more embodiments the slot 42 may be a through slot such as an aperture that extends through the thickness of longitudinal extending portion 38. As another example, the slot 42 may be a recessed portion of the longitudinal extending portion 38.

Figure 5:
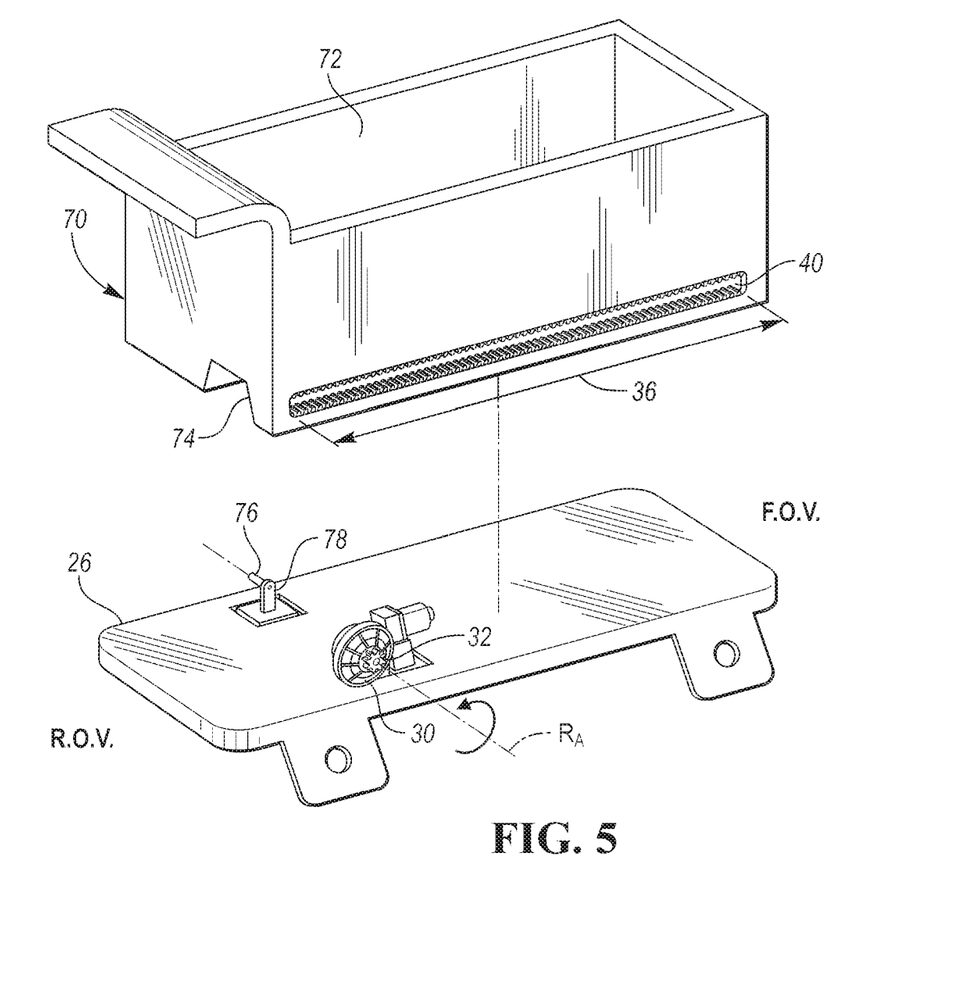
FIG. 5 is a partial-exploded-perspective view of an exemplary frame assembly of the moving center console.
Figure 6:
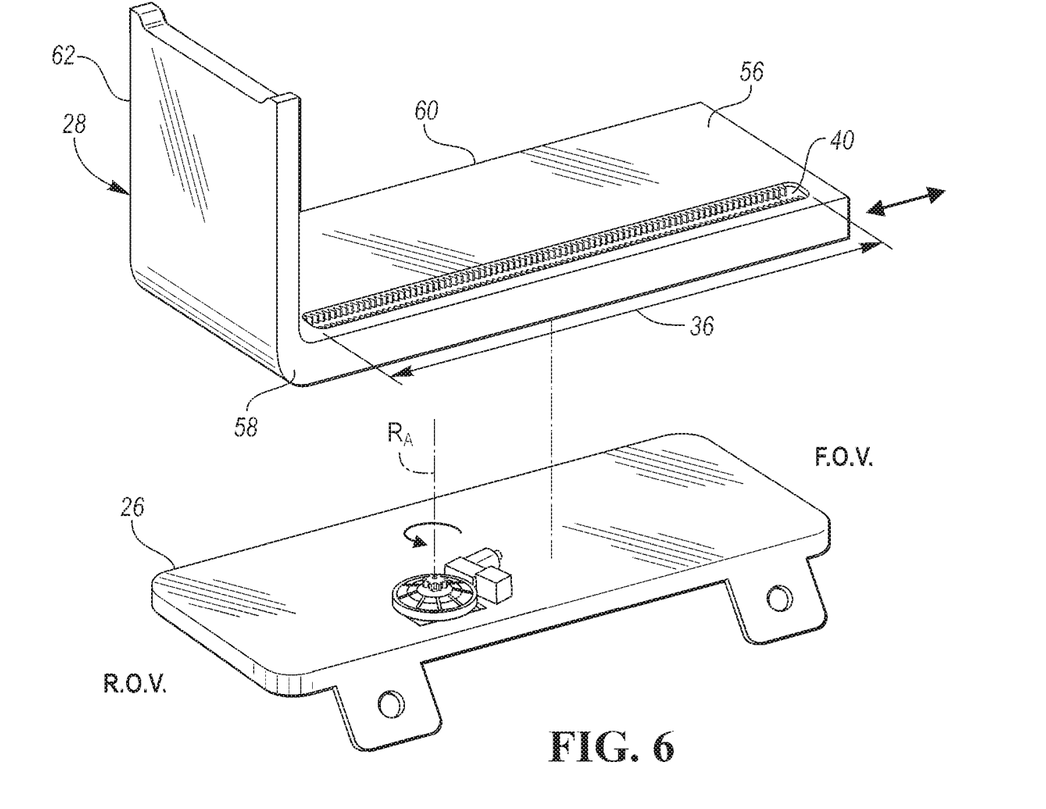
FIG. 6 is a partial-exploded-perspective view of an exemplary frame assembly of the moving center console.

In one or more embodiments the container 34 may be integrally formed with the carrier 28. For example, FIG. 5 depicts one example of a combined container and carrier 70. The combined container and carrier includes the first cavity 40 and plurality of teeth 36 as described above. The combined container and carrier 70 may define a receptacle 72 configured to store or house one or more items or objects.

The over-molding process may differ from a two-shot or multiple shot injection molding process, in that the substrate or first material may have cooled and hardened before the second material is injected into the die.

Figure 2:
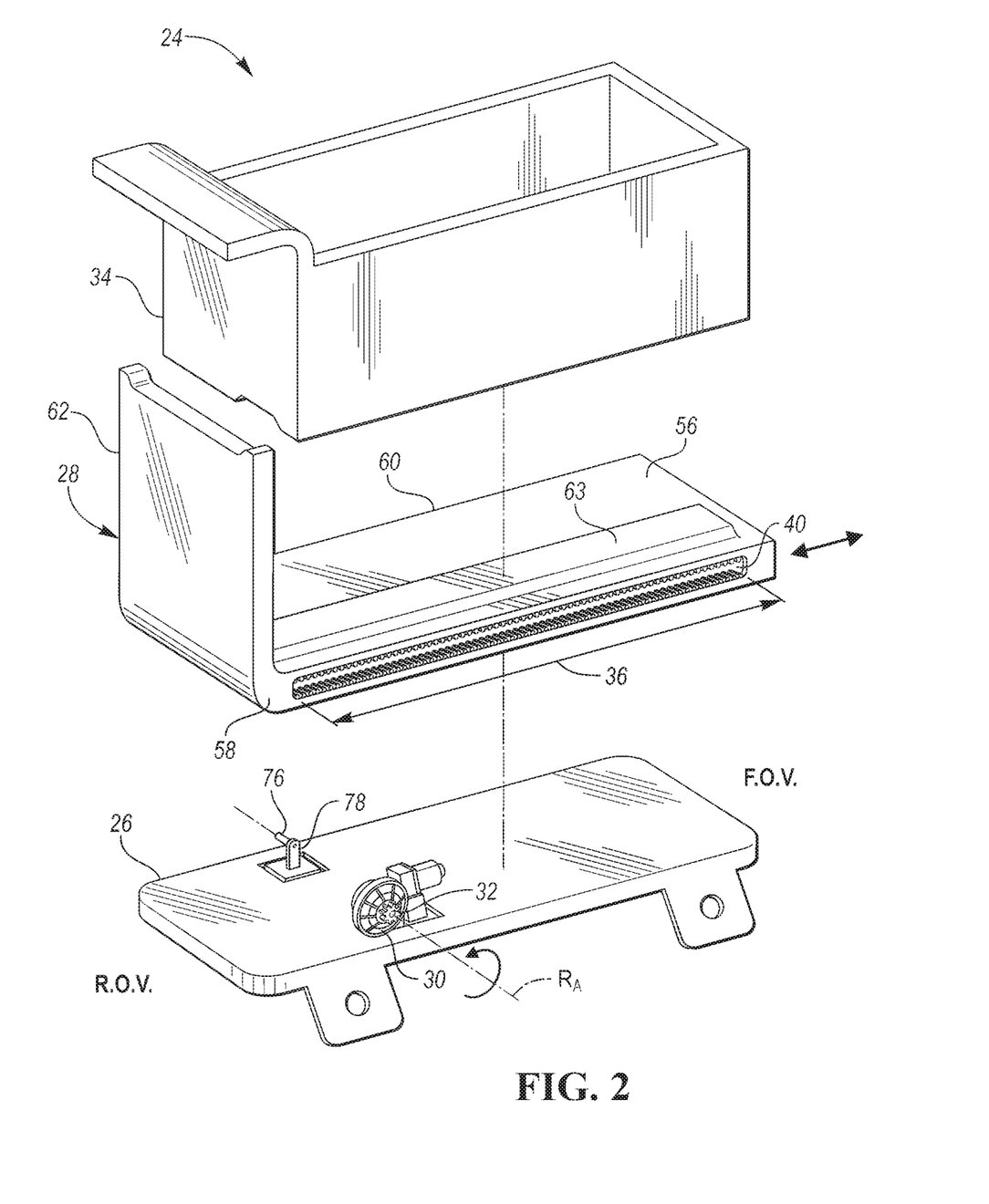
FIG. 2 is a partial-exploded-perspective view of an exemplary frame assembly of the moving center console.
Figure 3A:
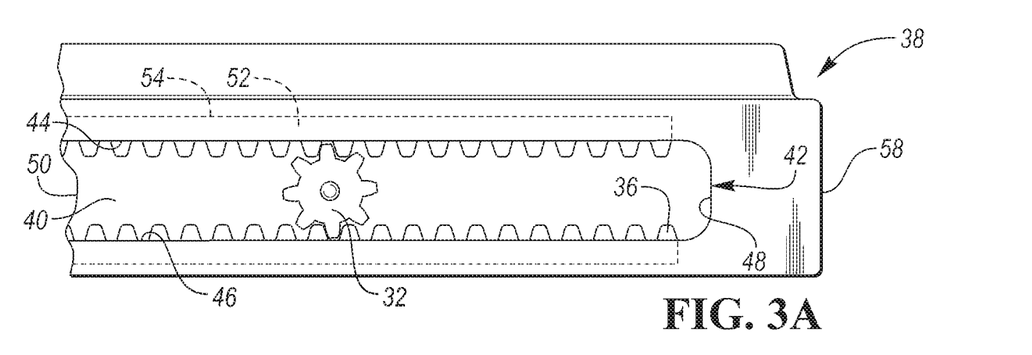
FIG. 3A is a plan view of a portion of an exemplary carrier of the frame assembly of the moving center console.
Figure 3B:
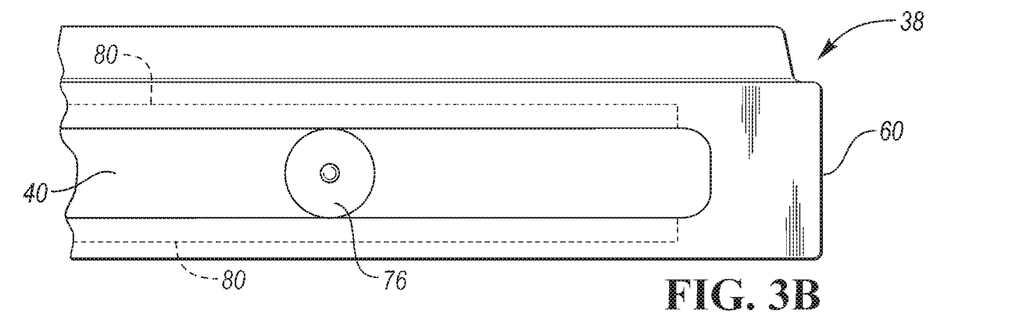
FIG. 3B is a plan view of another portion of an exemplary carrier of the frame assembly of the moving center console.

In one or more embodiments, a guide member such as a wheel or roller 76 attached to the base member 26 is provided (FIG. 2). The roller 76 may engage the cavity 40 that is defined by the slot within the first sidewall or second sidewall. The roller 76 may be disposed in the cavity 40 that is opposite to the cavity that engages the pinion 32. The roller 76 may engage a track 80 that may be coupled to the second sidewall 60 in a similar manner as described with reference to the elongated rack 52 and first sidewall 58. As another example, the roller 76 may engage the upper edge 44 and the lower edge 46 of the slot 42 (FIG. 4B). The roller 76 may be coupled to, directly or indirectly, the base member 26 by a stand or support member 78 so that the roller 76 is spaced apart from the base member 26.

Figure 4A:
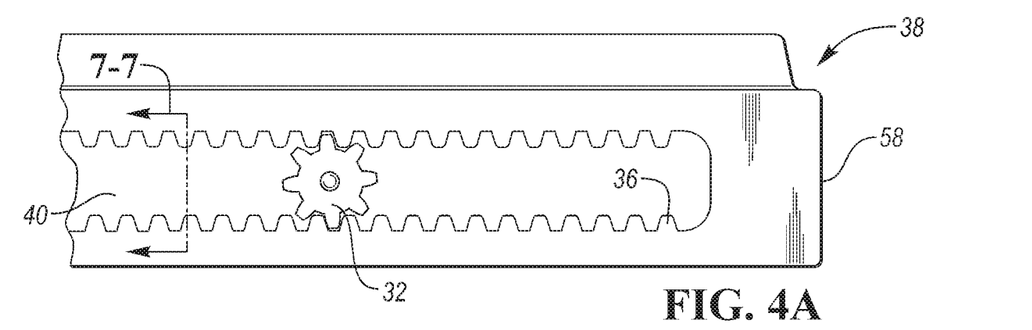
FIG. 4A is a plan view of a portion of another exemplary carrier of the frame assembly of the moving center console.
Figure 4B:
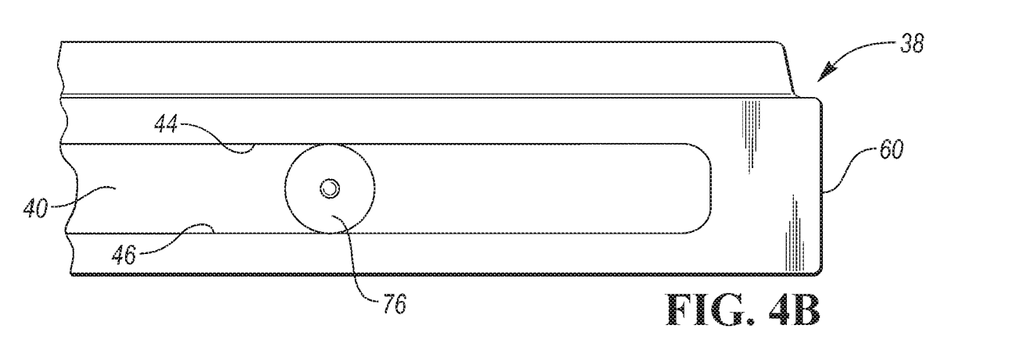
FIG. 4B is a plan view of another portion of the exemplary carrier from FIG. 4A.
Figure 7:
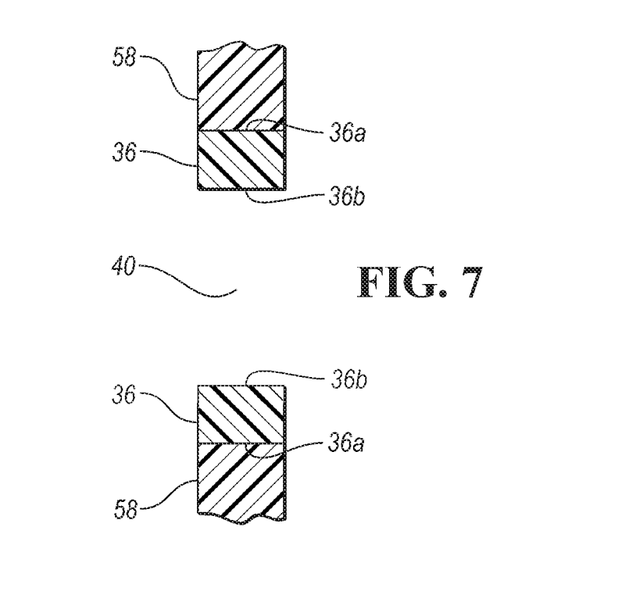
FIG. 7 is a cross-sectional view of taken along the lines 7-7 in FIG. 4A.

Referring to FIG. 7, a cross-sectional view of a portion of one of the sidewalls 58 and a pair of opposing teeth 36 taken along lines 7-7 in FIG. 4A is provided. Each of the teeth 36 may include a base portion 36a and a distal end 36b. As described above, the sidewall 58 may be formed of a first material and at least one of the plurality of teeth 36 may be formed of a second material that is different than the first. The base portion of one on the teeth 36 may be connected to or fixed to the sidewall by a bond.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

vehicle 10
vehicle floor 12
center console assembly 14
driver seat 16
passenger seat 18
fixed portion 20
translating portion 22
center console frame assembly 24
mounting member 26
carrier 28
gearbox assembly 30
pinion 32
container 34
teeth 36
longitudinal extending portion 38
cavity 40
longitudinal extending slot 42
upper inner edge 44
lower inner edge 46
front edge 48
rear edge 50
rack 52
second cavity 54
middle wall 56
first sidewall 58
second sidewall 60
vertical wall 62
raised portion 63
carrier and container member 70
receptacle 72
roller 76
support member 78
track 80
base portion 36a
distal end 36b

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A sliding center console for a vehicle comprising:
   a mounting member;

a carrier configured to receive a container and translate between a first position and a second position, the carrier including,
  a longitudinal-extending wall defining a slot forming a first cavity, wherein the slot includes a first inner wall and a second inner wall, and
  a plurality of teeth including a first set of teeth and a second set of teeth, wherein the first set of teeth extend from the first inner wall into the first cavity and the second set of teeth extend from the second inner wall in the first cavity; and
a gearbox assembly fixed to the mounting member including a pinion extending into the first cavity and engages a tooth of the plurality of teeth and configured to rotate in a first rotational direction or second rotational direction to translate the carrier from the first position to the second position.

2. The sliding center console of claim 1, wherein the inner wall is formed of a first material and a tooth of the plurality of teeth is formed of a second material different than the first material.

3. The sliding center console of claim 2, wherein the second material is a thermoplastic composite material.

4. The sliding center console of claim 2, wherein a base portion of the tooth of the plurality of teeth is fixed to a portion of the inner wall by a bond between the first and second materials.

5. The sliding center console of claim 1, wherein the carrier defines a second cavity configured to receive an elongated rack, wherein the elongated rack defines the plurality of teeth that extend into the first cavity.

6. The sliding center console of claim 1, wherein the at least a portion of the first set of teeth is over molded by a portion of the first inner wall.

7. The sliding center console of claim 1, further comprising:
  a guide member fixed to the mounting member and configured to guide the carrier along the mounting member.

8. The sliding center console of claim 7, wherein the guide member includes a roller and the carrier defines a track, wherein the roller engages the track as the carrier translates from the first position to the second position.

9. The sliding center console of claim 7, wherein the first position and the second position are spaced apart from one another along a longitudinal direction and wherein the gearbox assembly is spaced apart from the guide member in a direction that is transverse to the longitudinal direction.

10. A sliding center console for a vehicle comprising:
a mounting member;
a carrier configured to receive a container and move between a first position and a second position, wherein the carrier defines a cavity;
an elongated rack defining a plurality of teeth extending into the cavity; and
a gearbox assembly fixed to the mounting member including a pinion configured to rotate in a first rotational direction or second rotational direction to translate the carrier from the first position to the second position, and wherein at least a portion of the pinion is disposed within the cavity such that the pinion engages at least one tooth of the plurality of teeth defined by the elongated rack.

11. The sliding center console of claim 10, wherein the cavity is formed by a longitudinal slot defined by a longitudinal extending portion of the carrier, and wherein the elongated rack is fixed to a first inner edge of the longitudinal slot by a bond.

12. The sliding center console of claim 11, wherein the longitudinal slot includes a second inner edge and the plurality of teeth includes a first set of teeth and a second set of teeth, and wherein the second set of teeth extend from the second inner edge.

13. The sliding center console of claim 11, wherein the bond between the elongated rack and the inner edge is a molecular bond.

14. The sliding center console of claim 13, wherein one of the sidewalls defines a second longitudinal slot, and wherein the second longitudinal slot is configured to receive a guide member coupled to the mounting member.

15. The sliding center console of claim 11, wherein the longitudinal extending portion includes a middle wall extending between a pair of sidewalls and wherein the middle wall defines the longitudinal slot.

16. The sliding center console of claim 15, wherein the middle wall includes a raised section wherein the raised section is configured to receive a portion of the gearbox assembly.

17. The sliding center console of claim 11, wherein the elongated rack is formed of a first plastic material and the carrier is formed of a second plastic material, different than the first plastic material.

18. The sliding center console of claim 11, wherein the elongated rack is at least partially encapsulated by a section of the longitudinal extending portion.

19. The sliding center console of claim 18, wherein the elongated rack is over molded by the section of the longitudinal extending portion.

20. A sliding center console for a vehicle comprising:
a mounting member;
a container configured to translate between a first position and a second position, the container defining a receptacle and a cavity and including a plurality of teeth extending into the cavity; and
a gearbox assembly fixed to the mounting member including a pinion extending into the cavity to engage one or more of the plurality of teeth and configured to rotate in a first rotational direction or second rotational direction to translate the container from the first position to the second position.

21. The sliding center console of claim 20, wherein the cavity includes a first inner wall and a second inner wall each including a number of teeth of the plurality of teeth extends.

\* \* \* \* \*

UNITED STATES PATENT AND TRADEMARK OFFICE
CERTIFICATE OF CORRECTION

PATENT NO. : 10,946,802 B2
APPLICATION NO. : 16/290889
DATED : March 16, 2021
INVENTOR(S) : Daryl Harris et al.

It is certified that error appears in the above-identified patent and that said Letters Patent is hereby corrected as shown below:

In the Claims

In Column 8, Lines 56-57, Claim 21:
After "of the plurality of teeth"
Delete "extends".

Signed and Sealed this
Fifth Day of July, 2022

Katherine Kelly Vidal
Director of the United States Patent and Trademark Office